United States Patent [19]

Caunt et al.

[11] 4,161,461

[45] Jul. 17, 1979

[54] TREATMENT OF TRANSITION METAL COMPOUND

[75] Inventors: Anthony D. Caunt, Welwyn Garden City; Ian G. Williams, Letchworth, both of England

[73] Assignee: Imperial Chemical Industries Limited, London, England

[21] Appl. No.: 849,357

[22] Filed: Nov. 7, 1977

[30] Foreign Application Priority Data

Nov. 15, 1976 [GB] United Kingdom ............... 47449/76

[51] Int. Cl.² .............................................. C08F 4/64
[52] U.S. Cl. ................................ 252/429 B; 526/119; 526/140
[58] Field of Search ..................... 252/429 B, 429 C

[56] References Cited

U.S. PATENT DOCUMENTS

| | | | |
|---|---|---|---|
| 3,026,311 | 3/1962 | Coover et al. | 252/429 B X |
| 3,032,510 | 5/1962 | Tornquist et al. | 252/429 C |
| 3,094,568 | 6/1963 | Hay et al. | 252/429 B X |
| 3,549,717 | 12/1970 | Itakura et al. | 252/429 B X |
| 3,769,233 | 10/1973 | Hermans et al. | 252/429 A |
| 3,940,345 | 2/1976 | Caunt | 252/429 B |
| 3,972,866 | 8/1976 | Fortuin et al. | 252/429 B X |
| 4,111,834 | 9/1978 | Caunt et al. | 252/429 B |

FOREIGN PATENT DOCUMENTS

| | | |
|---|---|---|
| 981375 | 1/1965 | United Kingdom. |
| 998291 | 7/1965 | United Kingdom. |
| 1150845 | 5/1969 | United Kingdom. |

*Primary Examiner*—Patrick Garvin
*Attorney, Agent, or Firm*—Cushman, Darby & Cushman

[57] ABSTRACT

A solid compound of a transition metal is ground in the presence of aluminium chloride; titanium tetrachloride and at least one specified organic sulphur-containing compound are added, the whole mixture is ground and the ground product is then washed with an aromatic liquid. The transition metal compound is typically titanium trichloride. The organic sulphur-containing compound can be a sulphone, a sulphonamide or a condensed ring system containing at least one heterocyclic sulphur atom. The organic sulphur-containing compound can be diphenylsulphone. The solid compound of the transition metal may be one which also includes aluminium chloride. The quantities of materials added to the transition metal compound are, for each mole of the transition metal compound, 0.10 up to 2.50 moles of the organic sulphur-containing compound, 0.01 up to 0.50 mole of titanium tetrachloride and 0.01 up to 2.50 moles of aluminium chloride. The ground and washed product can be used as a component of an olefine polymerization catalyst.

16 Claims, No Drawings

TREATMENT OF TRANSITION METAL COMPOUND

The present invention relates to transition metal compounds, the treatment of such compounds and the use of such compounds as a component of an olefine polymerisation catalyst.

According to the present invention a solid compound of a transition metal of Groups IVA to VIA of the Periodic Table is ground in the presence of aluminium chloride, then titanium tetrachloride and at least one organic sulphur-containing compound of one of the formulae (A), (B) or (C) are added to the ground material, the mixture obtained is ground and the ground product is washed with a liquid medium capable of dissolving the at least one organic sulphur-containing compound and at least one of aluminium chloride or titanium tetrachloride or a complex of the at least one organic sulphur-containing compound and at least one of aluminium chloride or titanium tetrachloride, wherein formula (A) is

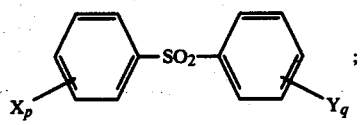

formula (B) is

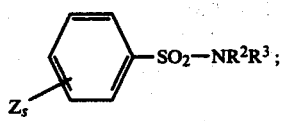

formula (C) is

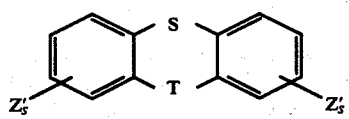

where

X, or each X, is, independently, a halogen atom, an alkyl, aryl, alkoxy, aryloxy, alkylthio, or arylthio group, or a group —NR$^1$R$^2$, or two groups X can together form a saturated or unsaturated hydrocarbon ring;

Y, or each Y, is, independently, a halogen atom, an alkyl, aryl, alkoxy, aryloxy, alkylthio, or arylthio group, or a group —NR$^1$R$^2$, or two groups Y can together form a saturated or unsaturated hydrocarbon ring; or a group X and a group Y may be replaced by a link between the two phenyl groups attached to the —SO$_2$— group, the linkage being either direct or through a group —O—, —CH$_2$—, —NR$^1$—, —S— or —CO—;

R$^1$ is a hydrogen atom or a hydrocarbyl group;
R$^2$ is a hydrocarbyl group;
p and q are each, independently, an integer from 0 up to 5;

Z, or each Z, is, independently, a halogen atom, an alkyl, aryl, alkoxy, aryloxy, alkylthio, or arylthio group, or a group —NR$^1$R$^2$, or two groups Z can together form a saturated or unsaturated hydrocarbon ring;

R$^3$ is a hydrocarbyl group or a group

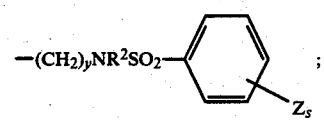

s is an integer from 0 to 5;
y is a positive integer;
T is —S—, —O—, —NR$^2$—, or —CO—; and
Z', or each Z', is, independently, a halogen atom, an alkyl, aryl, alkoxy, aryloxy, alkylthio, or arylthio group, or a group —NR$^1$R$^2$.

The solid compound of the transition metal is preferably in a valency state which is less than its maximum valency. The transition metal can be, for example, zirconium or vanadium, but it is particularly preferred to use a compound of titanium. It is preferred that the transition metal compound is a transition metal halide or oxyhalide (for example VOCl$_2$) and in particular a chloride, especially titanium trichloride. The term "titanium trichloride" is used herein to refer not only to pure titanium trichloride, but also titanium trichloride compositions which incorporate other materials, in particular aluminium chloride or alkyl aluminium chlorides. Such forms of titanium trichloride can be obtained, inter alia, by the reduction of titanium tetrachloride with aluminium metal or an organo-aluminium compound. Materials of the type, titanium trichloride/aluminium chloride, which are obtainable by the reduction of titanium tetrachloride with aluminium metal, are particularly preferred.

In the compounds of formula (A), if X or Y are alkyl, alkoxy or alkylthio groups, it is preferred that the group contains from 1 up to 6 carbon atoms. It is preferred that p and q are zero or one and the groups X and Y are preferably the same. The groups R$^1$ and R$^2$ are conveniently alkyl groups having from 1 up to 6 carbon atoms. If the groups X and Y are replaced by a link between the two phenyl groups attached to the —SO$_2$— group, the linkage is conveniently direct, through an oxygen atom or especially through a —CH$_2$— group. Compounds of formula A) include diphenylsulphone, 4(phenylthio)diphenylsulphone, 4(phenoxy) diphenylsulphone, 2,4'-(diphenoxy)diphenylsulphone, 4,4'-(diphenoxy)diphenylsulphone, 4,4'-dichlorodiphenylsulphone, 4,4'-(dimethyl)diphenylsulphone, 2,4,4'-(trimethyl) diphenylsulphone, 6-phenylsulphonyltetralin, dibenzothiophen-5,5-dioxide, phenoxathiin-10,10-dioxide, thioxanthene-10,10-dioxide and 10-methylphenothiazine-5,5-dioxide.

In the compounds of formula (B), the groups R$^1$, R$^2$ and R$^3$ are conveniently alkyl groups having from 1 up to 6 carbon atoms, but one, or both, of the groups R$^2$ and R$^3$ can be an aryl group. The group Z can be a bromine or a chlorine atom, or a phenoxy group. In the group

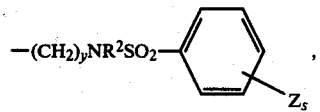

y is conveniently 1, 2 or 3 and s is zero. Compounds of formula B) include N,N-dimethylbenzenesulphonamide, N,N-diethylbenzenesulphonamide, N,N-diphenylbenzenesulphonamide, N-methyl-N-phenyl-4- bromobenzenesulphonamide, N-methyl-N-phenyl-4-chlorobenzenesulphonamide, N,N-diethyl-4-phenoxybenzenesulphonamide and N,N'-dibenzenesulphonyl-N,N-dimethyl-1,2-diaminoethane.

In the compound of the formula (C), s is preferably zero, and the compound is phenoxathiin, thianthrene or an N-hydrocarbyl phenothiazine such as N-methylphenothiazine.

We particularly prefer to use compounds of formula (A), especially diphenylsulphone.

The proportions of the aluminium chloride, titanium tetrachloride and organic sulphur-containing compound which are used depend on the particular organic sulphur-containing compound, and also on the solid compound of the transition metal. In general, for each gramme atom of the transition metal which is present in the solid compound of the transition metal, there may be added up to 2.50 moles of aluminium chloride, and the quantity of the organic sulphur-containing compound which is added may also be up to 2.50 moles. The amount of titanium tetrachloride which is used may be up to 0.50 mole for each gramme atom of the transition metal which is present in the solid compound of the transition metal.

The transition metal compound can contain aluminium chloride associated with it, for example as in the material represented by the general formula $TiCl_3 aAlCl_3$, where a may have a value of up to 1.50. In general, materials of this type have the formula $TiCl_3 bAlCl_3$ where b is 0 up to about 0.35 and using such a material, there is separately added from 0.01 up to 2.50, particularly from 0.05 up to 1.50 and especially from 0.20 up to 0.80 mole of aluminium chloride for each gramme atom of the transition metal which is present in the solid compound of the transition metal. Thus using a material of the type $[TiCl_3][0.33\ AlCl_3]$, the total amount of aluminium chloride present is in the range from 0.34 up to 2.83, particularly from 0.38 up to 1.83 and especially from 0.53 up to 1.13 moles for each gramme atom of the transition metal.

In the grinding process, the proportion of titanium tetrachloride used is conveniently in the range from 0.01 up to 0.50, particularly from 0.50 up to 0.30, and especially from 0.10 up to 0.20 mole for each gramme atom of the transition metal which is present in the solid compound of the transition metal.

In general, the proportions of the organic sulphur-containing compound are in the range from 0.10 up to 2.50, preferably from 0.20 up to 1.50, especially from 0.30 up to 0.75 mole, for each gramme atom of the transition metal which is present in the solid compound of the transition metal.

The amount of the organic sulphur-containing compound is dependent on the quantities of titanium tetrachloride and total aluminium chloride which are present during the grinding. In general an increase in the amount of one or both of the titanium tetrachloride and total aluminium chloride requires an increase in the amount of the organic sulphur-containing compound but it should be appreciated that if the amount of the organic sulphur-containing compound is increased, it is not necessary to increase the amounts of both the titanium tetrachloride and the total aluminium chloride and, in general, an increase in the amount of the total aluminium chloride will be sufficient.

As a particularly preferred aspect of the present invention titanium trichloride is ground in the presence of at least from 0.34 up to 2.83 moles of aluminium chloride, then from 0.01 up to 0.50 mole of titanium tetrachloride and from 0.10 up to 2.50 moles of at least one organic sulphur-containing compound of formula (A) are added to the ground material, the mixture obtained is ground, and the ground product is then washed with a liquid medium capable of dissolving the at least one organic sulphur-containing compound and at least one of aluminium chloride or titanium tetrachloride, or a complex of the at least one organic sulphur-containing compound and at least one of aluminium chloride or titanium tetrachloride.

We have found that good results can be obtained using very different proportions of the various materials. Thus, using a titanium trichloride composition of the type $TiCl_3 cAlCl_3$, where c is from 0.30 up to 0.35, good results have been obtained by adding aluminium chloride, diphenylsulphone, and titanium tetrachloride in the proportions, relative to the titanium trichloride content of the $TiCl_3 AlCl_3$, set out in the following table.

| Added AlCl₃ (mole %) | Added diphenylsulphone (mole %) | Added TiCl₄ (mole %) |
|---|---|---|
| 50 | 60 | 10-20 |
| 107 | 90-105 | 20 |
| 207 | 190 | 20 |

The amount of the organic sulphur-containing compound and the amount of added aluminium chloride required to achieve a good result is conveniently expressed by the relationship:

$$0.8A \leq S \leq 0.8A + 0.35$$

where
S is the number of moles of the organic sulphur-containing compound which is added; and
A is the number of moles of aluminium chloride which is added.

The grinding is conveniently effected using a ball mill and it is preferred that at least a proportion of the grinding is effected in the dry state — that is, in the absence of added solvent and suspending liquids. The materials to be ground can be introduced into the mill, or other grinding apparatus, either in the absence of solvents or as a solution or suspension in a suitable inert diluent which is subsequently removed either by heating, reducing the pressure, or both. The solid compound of a transition metal and the aluminium chloride are introduced into the grinding apparatus before starting the grinding and after a period of grinding, the titanium tetrachloride and the organic sulphur-containing compound are added and the grinding is continued. The grinding can be effected at any suitable temperature and satisfactory results may be obtained by grinding at ambient temperature (about 20°-25° C.) although it will be realised that higher or lower temperatures may be used if desired, for example from −20° C. up to 100° C. The temperature may be varied during the grinding process. The total grinding time is conveniently from 5 hours up to 120 hours or more, for example from 24 up to 72 hours. The grinding of the solid compound of a transition metal and the aluminium chloride is conveniently effected for at least 30% of the total grinding time, especially 50 to 85% of the total grinding time. It will be appreciated that the total grinding time will be dependent on the intensity of the grinding and, when using a rotating ball mill which gives a tumbling action, will depend on the material, size and number of balls used, and the speed of revolution of the ball mill. Other grinding techniques may be used, for example grinding in a vibrating mill, and when using such other techniques different times and temperatures of grinding may be preferred.

The ground product may be removed from the grinding apparatus as a dry solid but it may be more readily removed by adding a suitable liquid medium, in particular an inert organic liquid such as an aliphatic hydrocarbon, and removing the ground solid as a suspension in the liquid medium. If desired, to facilitate removal of the suspension, a short period, typically not more than 30 minutes, of wet grinding may be effected at the end of the dry milling stage.

When the grinding has been completed and the ground product has been removed from the grinding apparatus, it is then washed with a liquid medium as defined. Aromatic compounds are suitable for use as the liquid medium, for example toluene, xylene, and chlorobenzene. The washing is preferably effected at an elevated temperature of at least 80° C., especially at least 100° C., possibly as high as 150° C. The washing is conveniently effected by suspending the ground solid in the liquid medium for a time of from 1 minute up to 20 hours, conveniently from 5 minutes up to 5 hours, especially about 30 minutes, allowing the solid to settle and decanting off the supernatant liquid. The washing step can be repeated but, if desired, other liquid media, for example liquid aliphatic hydrocarbons, can be used for the subsequent washing steps.

All stages in the process of the present invention are effected in an inert atmosphere, in the absence of any quantity of such oxygen-containing materials as air and water vapour, which quantity is sufficient to deleteriously affect the characteristics of the ground product as a component of an olefine polymerisation catalyst.

The ground and washed transition metal compound is suitable for use as a component of a catalyst for the polymerisation of ethylenically unsaturated hydrocarbon monomers.

Thus, according to a further aspect of the present invention, there is provided an olefine polymerisation catalyst comprising:

(1) a transition metal component which is the product of grinding and washing as hereinbefore described; and (2) at least one organo-metallic compound of aluminium, or of a non-transition metal of Group IIA of the Periodic Table, or a complex of an organo-metallic compound of a non-transition metal of Group IA or IIA of the Periodic Table and an organo-aluminium compound.

Component (2), the organo-metallic compound, can be a Grignard reagent which is substantially ether-free, or a compound of the type $Mg(C_6H_5)_2$. Alternatively, component (2) can be a complex of an organo-metallic compound of a metal of Groups IA or IIA, such as, for example $Mg(AlEt_4)_2$ or a lithium aluminium tetraalkyl. It is preferred that component (2) is an organo-aluminium compound such as a bis(dialkylaluminium)oxyalkane, a bis(dialkylaluminium)oxide, an aluminium hydrocarbyl sulphate, an aluminium hydrocarbyl oxyhydrocarbyl or particularly an aluminium trihydrocarbyl or a dihydrocarbylaluminium hydride or halide especially aluminium triethyl or diethylaluminium chloride. A mixture of compounds can be used if desired, for example a mixture of an aluminium trialkyl and a dialkylaluminium halide. It may be preferred to use catalysts giving a low level of residual halogen in the polymer product, in which case component (2) is desirably a halogen-free compound, particularly an aluminium trihydrocarbyl.

In addition to components (1) and (2), the catalyst can include one or more further components. Thus, the catalyst can include at least one organo-Lewis Base compound (component(3)). The organo-Lewis Base compound can be the same as that which is used in the production of component (1) of the catalyst. Component (3) may be an organic sulphur-containing compound of one of the formulae (A) to (C). However, other organo-Lewis Base compounds can be used, such as, for example ethers and thioethers; alcohols and thiols; ketones and thioketones; organo-silicon compounds such as the silanes and siloxanes; amides such as formamide; urea and thiourea and the substituted derivatives thereof such as N,N,N',N'-tetramethylurea and alkanolamines such as β(N,N-dimethylamino) ethanol. Other organo-Lewis Base compounds which may be used as component (3) are compounds having one of the formulae (D), (E) and (F), where formula (D) is $R^4R^5R^6P(O)_m$;

formula (E) is $R^8R^9R^{10}N$;

and formula (F) is $R^{11}R^{12}P(Q)_zED$ where $R^4$, $R^5$ and $R^6$ are each independently, an alkyl or aryl group, or a group $-NR^7_2$ or $-OR^7$;

$R^7$ is an alkyl group of 1 to 4 carbon atoms;

m is 0 or 1;

$R^8$ and $R^9$ are hydrocarbyl groups;

$R^{10}$ is a hydrogen atom, an alkyl group or a group $-C_nH_{2n}NR^8R^9$;

or $R^8$ and $R^9$, optionally with $R^{10}$, together form a substituted or unsubstituted, saturated or unsaturated, condensed or uncondensed ring system;

n is 1, 2 or 3;

$R^{11}$ is halogen, a hydrocarbyl group, a group $-NR^2_2$ or $-OR^2$, a heterocyclic group or a group (E—L—G);

$R^2$ is as defined;

$R^{12}$ is halogen, a hydrocarbyl group, a group $-NR^2_2$ or $-OR^2$, a heterocyclic group, a group (E—L—G) or ED;

each E is $-O-$, $-S-$, or $-NR^2-$, and may be the same or different;

G is $-OR^2$, $-SR^2$, $-NR^2_2$, $-PR^2_2$ or a heterocyclic ring system whereof the heteroatom is O, S, N, or P;

D is a group $-LG$ or $-P(Q)_zR^{11}R^{12}$, or, when $R^{12}$ is ED, both the D groups may together form a group $-L-$;

L is a bivalent hydrocarbyl radical such that E and G or E and E are separated by not more than 3 carbon atoms;

Q is an oxygen or sulphur atom; and z is 0 or 1.

Compounds of formula (D) include tributylphosphine, triphenylphosphine, tributylphosphine oxide, triphenylphosphine oxide, N,N,N',N'-tetramethylethyl phosphorodiamidate and hexamethyl phosphoric triamide.

Compounds of formula (E) include di-n-butylamine, triethylamine, tri-n-butylamine, N,N,N',N'-tetramethylethylenediamine, pyridine, piperidine, picoline, quinoline and isoquinoline.

Compounds of formula (F) include N,N,N',N',N''-pentamethyl-N''-β-dimethylaminoethyl phosphoric triamide; 2-dimethylamino-1,3-dimethyl-1,3,2-diazaphospholidine-2-oxide; β-dimethylaminoethyl-N,N,N',N'-tetramethylphosphorodiamidate; 2-ethoxy-1,3-dimethyl-1,3,2-diazaphospholidine-2-oxide; 2-dimethylamino-1-methyl-1,3,2-azoxaphospholidine oxide and octamethylpyrophosphoramide.

Particularly preferred organo-Lewis Bases for use as component (3) are compounds of formulae (D), (E) or (F), for example the secondary and tertiary amines such as dibutylamine, triethylamine or tributylamine, diamines such as N,N,N',N'-tetramethylethylenediamine, and compounds containing both nitrogen and phosphorus atoms such as hexamethyl phosphoric triamide, ethyl N,N,N',N'-tetramethylphosphorodiamidate, N,N,N',N',N''-pentamethyl-N''-β-dimethylaminoethyl phosphoric triamide; 2-dimethylamino-1,3-dimethyl-1,3,2-diazaphospholidine-2-oxide and octamethylpyrophosphoramide.

In addition to, or instead of, the organo-Lewis Base compound which may be present as component (3), the catalyst system can include a substituted or unsubstituted polyene (component (4)), which may be acyclic polyene such as 3-methyl-1,4,6-heptatriene or a cyclic polyene such as cyclooctatriene, cyclooctatetraene or cycloheptatriene or derivatives of such polyenes such as the alkyl- or alkoxy-substituted polyenes; tropylium salts or complexes, tropolone or tropone.

The proportions of the various catalyst components can be varied widely depending both on the materials used and the absolute concentrations of the components. However, in general for each gramme atom of the transition metal which is present in component (1) of the catalyst, there is present at least 0.05, and preferably at least 1.0 mole, of component (2); but it may be desirable to use much greater quantities of component (2), for example as many as 50 moles or even more, for each gramme atom of the transition metal which is present in component (1). In general we prefer to use not more than 25, and particularly not more than 10, moles of component (2) for each gramme atom of the transition metal which is present in component (1). The amount of the organo-Lewis Base compound, which is the optional component (3), is in the range from 0.01 up to 10, preferably from 0.05 up to 5.0, and especially from 0.2 up to 2, moles for each gramme atom of the transition metal which is present in component (1) of the catalyst, and the amount, in moles, of component (3) is less than the amount, in moles, of component (2). The number of moles of any polyene which is present in the catalyst is preferably less than the number of moles of component (2) of the catalyst. For each mole of component (2), there are conveniently present from 0.01 up to 1.0, especially 0.05 up to 0.5, for example 0.2 mole, of the polyene. If the catalyst includes both components (3) and (4) the number of moles of the organo-Lewis Base compound which is compound (3) and the polyene should preferably, in total, be less than the number of moles of component (2) of the catalyst. If the catalyst includes both components (3) and (4), these can conveniently be used in equimolar proportions but the relative proportions of these components may be varied to give the optimum result.

A preferred catalyst within the present invention comprises:

(1) a titanium trichloride containing material obtained by milling a titanium trichloride material with aluminium chloride, then adding to the milled material, titanium tetrachloride and at least one organo-Lewis Base compound which is selected from materials of the formulae:

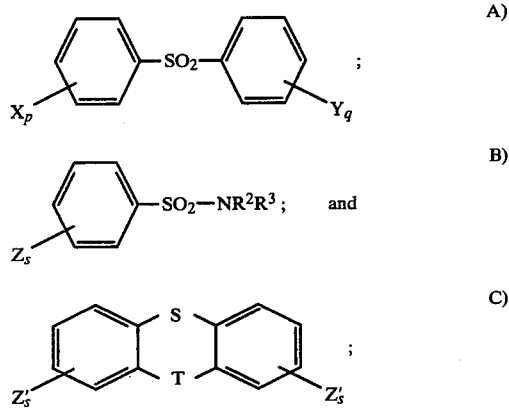

milling the mixture and thereafter washing the ground product with a liquid medium capable of dissolving the at least one organo-Lewis Base compound and at least one of titanium tetrachloride or aluminium chloride, or a complex of the at least one organo-Lewis Base compound and at least one of titanium tetrachloride or aluminium chloride;

(2) at least one organo-aluminum compound; and optionally (3) a further quantity of an organo-Lewis Base compound which is selected from materials of the formulae (A), (B), (C), (D), (E) or (F) (as hereinbefore defined), where $R^2$, $R^3$, T, X, Y, Z, Z', p, q and s are all as hereinbefore defined.

The Lewis Base which is component (3) of the catalyst is conveniently hexamethyl phosphoric triamide; 2-dimethylamino-1,3-dimethyl-1,3,2-diazaphospholidine-2-oxide; N,N,N',N',N''-pentamethyl-N''-β-dimethylaminoethylphosphoric triamide; N,N,N',N'-tetramethylethylenediamine; tributylamine or diphenylsulphone.

The catalysts of the present invention are particularly suitable for the polymerisation and copolymerisation of olefine monomers by contacting at least one olefine monomer with a catalyst of the type hereinbefore defined.

More specifically, there is provided a process for the production of a polymer or copolymer of an olefine monomer wherein at least one olefine monomer, or a mixture of at least one olefine monomer and ethylene, is contacted, under polymerisation conditions, with an olefine polymerisation catalyst as hereinbefore defined.

Any olefine monomer, particularly mono-α-olefine monomer, which is capable of being polymerised using a Ziegler catalyst may be polymerised by the process of the present invention. Thus, monomers which can be polymerised by the present process include butene-1, and 4-methylpentene-1 and particularly propylene. These olefines may be copolymerised together but we prefer to effect copolymerisation with ethylene, conveniently using a sequential polymerisation process such as described in British Patent Specifications Nos. 970,478; 970,479 and 1,014,944.

We have found that the process of the present invention can be used for the polymerisation of propylene to give a high yield of polymer relative to the amount of catalyst used and also a relatively low proportion of the undesirable soluble polymer.

It is well known that catalysts of the "Ziegler" type are susceptible to the effects of impurities and the activity and stereospecificity of such catalysts can be affected in a detrimental manner by the presence of small quantities of impurities, particularly oxygen and polar compounds such as water and alcohol in the monomer and/or diluent when used. Thus, for the polymerisation of olefine monomers using Ziegler catalysts, it is known to use pure monomers and diluents. However, when using catalysts in accordance with the present invention, these can be used in smaller proportions than the conventional Ziegler type catalyst and accordingly are more susceptible to any impurities present in the system. Thus, for use with the catalyst of the present invention, it is desirable that the monomers and any diluents which are of commercial purity are subjected to a further purification procedure.

The purification treatment can be effected in more than one stage if desired. The particular purification treatment used will be dependent on the purity of the starting materials.

Satisfactory purity can be achieved in most cases by passing the monomer (and diluent, if used) through a bed of a material which is capable of absorbing the impurities contained in the monomer or diluent, for example as described in British patent specifications Nos. 1,111,493 and 1,226,659. The purified monomer conveniently contains less than 1 ppm by volume of water and less than 0.5 ppm by volume of oxygen. Any purified diluent used conveniently contains less than 10 ppm by weight of each of water and oxygen.

Using catalysts in accordance with the present invention, polymerisation can be carried out in the presence or absence of an inert diluent such as a suitably purified paraffinic hydrocarbon. If a diluent is not used, polymerisation can be effected in the liquid phase using excess liquid monomer as the suspension medium for catalyst and polymer product. If the monomer is used in the gaseous phase, polymerisation can be effected using any technique suitable for effecting a gas/solid reaction such as a fluidised bed reactor system or a ribbon blender type of reactor.

Polymerisation may be effected either in a batch manner or on a continuous basis. The catalyst components may be introduced into the polymerisation vessel separately but it may be preferred, particularly if polymerisation is being effected on a continuous basis, to mix all the catalyst components together before they are introduced into the polymerisation reactor. Alternatively, in a batch process, not all of the catalyst is added at the beginning of the polymerisation. Thus, a proportion of the catalyst may be added to initiate polymerisation and further quantities of one or more of the catalyst components are added at one or more times during the polymerisation. Conveniently at least 25% of each catalyst component is added to initiate polymerisation, the remaining catalyst components being added during the polymerisation. Since feeding a slurry of a solid material may be inconvenient, it may be preferred that all of the transition metal compound is added, together with some of each of the other catalyst components, to initiate polymerisation and the rest of the other catalyst components are added during the polymerisation.

The polymerisation can be effected in the presence of a chain transfer agent, such as hydrogen or a zinc dialkyl, in order to control the molecular weight of the product formed. The chain transfer agent, if present, is conveniently hydrogen which is present in an amount of up to 5% molar relative to the monomer, conveniently in an amount of from 0.10 up to 2.0% molar relative to the monomer, or monomers, being polymerised. The amount of chain transfer agent used is dependent on the polymerisation temperature which is typically in the range from 20° up to 100° C. especially from 60° up to 85° C.

Polymers in accordance with the present invention have a high molecular weight as indicated by the melt flow index measured according to ASTM Test Method D 1238-70, using Condition N (that is, a temperature of 190° C. and a weight of 10 kg). Polymers in accordance with the present invention have a melt flow index of less than 200. Preferred polymers have a melt flow index of less than 100, particularly less than 50, for example between 5 and 50.

Various aspects of the present invention will now be described with reference to the following Examples which are illustrative of the invention. In the Examples, all operations were effected under an atmosphere of nitrogen unless otherwise indicated.

EXAMPLE 1

Into a stainless steel mill of 15.2 cm in length and 7.9 cm in diameter, and fitted internally with four metal strips, were introduced 200 stainless steel balls of 12.7 mm diameter and 200 stainless steel balls of 6.35 mm diameter. The mill was sealed, evacuated to 0.2 mm of mercury, and purged with nitrogen, to give a nitrogen atmosphere in the mill. 20 g of titanium trichloride (Stauffer-TiCl$_3$-AA of the approximate formula [TiCl$_3$][0.33 AlCl$_3$]) was introduced as a solid into the mill which was shaken manually. Aluminium chloride (0.50 mole for each mole of TiCl$_3$ present in the Stauffer-TiCl$_3$-AA) was added and the mill was rotated at 120 rpm for 42 hours whilst running water at 20° C. over the exterior of the mill. The flow of water and the rotation of the mill was stopped. Titanium tetrachloride (0.10 mole for each mole of TiCl$_3$ present in the Stauffer-TiCl$_3$-AA) and diphenylsulphone (0.60 mole for each mole of TiCl$_3$ present in the Stauffer-TiCl$_3$-AA) were added to the contents of the mill and milling was continued for a further 22 hours whilst running water at 20° C. over the exterior of the mill.

At the end of the milling, the titanium trichloride product was suspended in an inert aliphatic hydrocarbon liquid (boiling point range of about 170°–180° C.) and readily removed from the mill. The milled product thus obtained will hereafter be referred to as TiCl$_3$-MOA or simply as MOA.

Analysis of TiCl$_3$-MOA revealed the presence of 0.68 mole of aluminium chloride and 0.62 mole of diphenylsulphone for each gramme atom of titanium (includes TiCl$_3$ and TiCl$_4$).

An aliquot portion of the suspension containing about 20 mMol of TiCl$_3$-MOA was transferred to an argon purged vessel having a glass sinter base and provided with a stirrer. The vessel was immersed in an oil bath at room temperature. The liquid was filtered off and the solid was resuspended in 50 ml sodium-dried, degassed toluene. The oil bath was heated to 110° C. After 30 minutes at 110° C. the toluene was filtered off.

The solid was then treated with toluene in the manner described twice more. The oil bath was then cooled to room temperature and the solid was treated twice with 100 ml portions of dry, degassed heptane in the manner described for the treatment with toluene. The solid, which will hereafter be referred to as $TiCl_3$-I, or simply I, was then suspended in 500 ml of heptane. Analysis of $TiCl_3$-I revealed the presence of 0.37 mole of aluminium chloride and 0.13 mole of diphenylsulphone for each mole of titanium trichloride.

The procedure described for the preparation of $TiCl_3$-I was repeated except that the treatment with toluene at 110° C. was replaced by treatment with an inert aliphatic hydrocarbon liquid (boiling point range of about 170°–180° C.) at a temperature of 120° C. The product obtained will hereafter be referred to as $TiCl_3$-MOB, or simply as MOB. Analysis of $TiCl_3$-MOB revealed the presence of 0.87 mole of aluminium chloride and 0.63 mole of diphenylsulphone for each mole of titanium trichloride.

EXAMPLE 2

The milling and toluene washing procedure of Example 1 was repeated. The milled product (hereafter referred to as $TiCl_3$-MOC) was found to contain 0.79 mole of aluminium chloride and 0.62 mole of diphenylsulphone for each gramme atom of titanium. The toluene washed product (hereafter referred to as $TiCl_3$-II) was found to contain 0.38 mole of aluminium chloride and 0.10 mole of diphenylsulphone for each mole of titanium trichloride.

EXAMPLE 3

The milling and toluene washing procedure of Example 1 was repeated except that 0.48 mole of diphenylsulphone was used in the milling for each mole of $TiCl_3$ present in the Stauffer-$TiCl_3$-AA.

The milled product (hereafter referred to as $TiCl_3$-MOD) was found to contain 0.80 mole of aluminium chloride for each gramme atom of titanium. The washed product (hereafter referred to as $TiCl_3$-III) was found to contain 0.41 mole of aluminium chloride and 0.06 mole of diphenylsulphone for each mole of titanium trichloride.

EXAMPLE 4

The procedure of Example 3 was repeated with the exception that 0.20 mole of titanium tetrachloride was used in the milling for each mole of $TiCl_3$ present in the Stauffer-$TiCl_3$-AA. The milled product will be referred to as $TiCl_3$-MOE and the washed product as $TiCl_3$-IV.

EXAMPLE 5

The procedure of Example 4 was repeated with the exception that 0.70 mole of diphenylsulphone was used in the milling for each mole of $TiCl_3$ present in the Stauffer-$TiCl_3$-AA. The milled product will be referred to as $TiCl_3$-MOF and the washed product as $TiCl_3$-V.

EXAMPLE 6

The procedure of Example 1 was repeated with the exception that 0.20 mole of titanium tetrachloride was used in the milling for each mole of $TiCl_3$ present in the Stauffer-$TiCl_3$-AA. The washed product will be referred to as $TiCl_3$-VI.

The procedures of Examples 1 to 6 are summarised in Table 1.

Table 1

| Form of $TiCl_3$ | Materials added to $TiCl_3$ for milling | | | Washing Liquid (b) |
|---|---|---|---|---|
| | $AlCl_3$ (moles/g. atom Ti) | DPS (a) (moles/g. atom Ti) | $TiCl_4$ (moles/g. atom Ti) | |
| MOA | 0.50 | 0.60 | 0.10 | NIL |
| I | 0.50 | 0.60 | 0.10 | T |
| MOB | 0.50 | 0.60 | 0.10 | A |
| MOC | 0.50 | 0.60 | 0.10 | NIL |
| II | 0.50 | 0.60 | 0.10 | T |
| MOD | 0.50 | 0.48 | 0.10 | NIL |
| III | 0.50 | 0.48 | 0.10 | T |
| MOE | 0.50 | 0.48 | 0.20 | NIL |
| IV | 0.50 | 0.48 | 0.20 | T |
| MOF | 0.50 | 0.70 | 0.20 | NIL |
| V | 0.50 | 0.70 | 0.20 | T |
| VI | 0.50 | 0.60 | 0.20 | T |

Notes to Table 1
(a) DPS means diphenylsulphone.
(b) NIL means that the milled product was not washed. T means that the milled product was washed with toluene. A means that the milled product was washed with an inert aliphatic hydrocarbon liquid (boiling point range about 170°–180° C.).

EXAMPLE 7

A stainless steel ball mill 22 cm long and 13.2 cm diameter was charged with 3575 g of 1.25 cm diameter steel balls, evacuated to 0.2 mm of nitrogen and pressurised with nitrogen to atmospheric pressure. 35.72 g (267 mmol) of anhydrous aluminium chloride were added. The mill was again evacuated and pressurised with nitrogen and 106.5 g (536 mmol) of Stauffer-$TiCl_3$-AA were added. The mill was rotated at 76 rpm for 24 hours at 20° C. 70.2 g (322 mmol) of diphenylsulphone were added under nitrogen. The mill was placed on rolls and 5.9 $cm^3$ (53 mmol) of titanium tetrachloride were added from a syringe taking care to distribute the liquid as evenly as possible. The mill was rotated for a further 20 hours at 76 rpm and 20° C. The contents of the mill were then removed under nitrogen by milling with 300 $cm^3$ of an inert aliphatic hydrocarbon liquid (boiling point range of about 170°–180° C.) for 5 minutes, and removing from the mill, which was then washed out with more hydrocarbon liquid into a storage flask. The temperature of 20° C. in the mill was maintained by running water at 20° C. over the exterior of the mill.

The milled product was filtered cold under argon and washed three times with 750 $cm^3$ of dry toluene at 110° C. stirring 30 minutes each time with the solvent, as described in Example 1. The milled and washed solid was finally filtered and suspended in the inert aliphatic hydrocarbon liquid. The washed solid analysed as $TiCl_3$ 0.29 $AlCl_3$, 0.075 diphenylsulphone and will hereafter be referred to as $TiCl_3$-VII.

EXAMPLES 8 AND 9

The milling procedure of Example 7 was repeated using 30.8 g (231 mmol) of anhydrous aluminium chloride, 92 g (463 mmol) of Stauffer-$TiCl_3$-AA, 60.6 g (278 mmol) of diphenylsulphone and 5.09 $cm^3$ (46 mmol) of titanium tetrachloride.

A sample of the suspension of the milled product, containing about 50 mmol of titanium trichloride, was washed three times with 150 $cm^3$ of toluene using the procedure of Example 1. This material will hereafter be referred to as TiCl$_3$-VIII.

A further sample of the suspension of the milled product, containing about 50 mmol of titanium trichloride, was washed three times with 150 cm$^3$ of chlorobenzene using the procedure of Example 1. This material will hereafter be referred to as TiCl$_3$-IX.

EXAMPLES 10 TO 18

The products of Examples 1 to 9 (TiCl$_3$-I to IX) and the comparative examples (TiCl$_3$-MOA to MOF) were used to polymerise propylene.

The propylene used for the polymerisation had been purified by passing gaseous propylene in turn through a column (7.6 cm in diameter, 0.9 m in length) containing 1.6 mm granules of Alcoa F1 alumina at 50°–60° C., and then through a similar column containing BTS catalyst (cupric oxide reduced to finely divided metallic copper on a magnesium oxide support) at 40°–50° C., condensing the issue gas and passing the liquid propylene through four columns (all 7.6 cm in diameter; two of 0.9 m in length, two of 1.8 m in length) at 25° C., each containing 1.6 mm pellets of Union Carbide 3A molecular sieves.

This treatment reduced the water content of the monomer from 5–10 ppm by volume to <1 ppm by volume and the oxygen content from 1–2 ppm by volume to <0.5 ppm by volume. The level of inert compounds (nitrogen, ethane, etc.) was unchanged at 0.3% and the level of unsaturated hydrocarbons (allene, methyl-acetylene etc.) was unchanged at <1 ppm.

A polymerisation flask equipped with efficient stirrer and a water jacket was dried carefully and 1 liter of an inert hydrocarbon diluent having a boiling point range of about 170°–180° C. was introduced. The diluent was evacuated at 70° C., purged with nitrogen and evacuated, which treatment effectively reduced the water and oxygen contents of the diluent to below 10 ppm by weight.

The diluent was then saturated with the purified propylene, which contained 0.12% molar of hydrogen, to one atmosphere pressure. 10 millimole of diethyl aluminium chloride was introduced into the polymerisation flask, and 1 millimole of tri(n-butyl)amine was introduced directly after the aluminium alkyl compound. After half an hour, 2 millimole of TiCl$_3$, obtained as described in Examples 1 to 9, was introduced into the polymerisation flask. The pressure in the polymerisation flask was maintained at one atmosphere by supply of propylene containing 0.12% molar of hydrogen. After a period of 4 hours from the introduction of the TiCl$_3$, the run was terminated with 5 ml of isopropanol and 5 ml of propylene oxide, and a sample of supernatant liquid extracted for determining the concentration of soluble polymer dissolved in the polymerisation diluent. The solid was filtered and washed three times with petrol ether and dried in a vacuum oven at 120° C. for an hour.

The results obtained are set out in Table 2.

Table 2

| Example or Comparative Example | Form of TiCl$_3$ | Yield of Solid Polymer (g/mMol TiCl$_3$) (c) | % Weight of Soluble Polymer (d) |
|---|---|---|---|
| 10 | I | 61.5 | 1.1 |
| 11 | II | 61.3 | 0.75 |
| 12 | III | 44.5 | 1.3 |

Table 2-continued

| Example or Comparative Example | Form of TiCl$_3$ | Yield of Solid Polymer (g/mMol TiCl$_3$) (c) | % Weight of Soluble Polymer (d) |
|---|---|---|---|
| 13 | IV | 31.5 | 1.5 |
| 14 | V | 51.0 | 0.9 |
| 15 | VI | 68.3 | 0.7 |
| 16 | VII | 56.3 | 0.56 |
| 17 | VIII | 48.0 | 0.85 |
| 18 | IX | 52.8 | 0.88 |
| A | MOA | 27.9 | 1.5 |
| B | MOB | 30.5 | 0.8 |
| C | MOC | 20.7 | 2.2 |
| D | MOD | 25.2 | 1.7 |
| E | MOE | 22.1 | 1.8 |
| F | MOF | 25.1 | 1.9 |

Notes to Table 2
(c) Based on solid polymer only relative to the TiCl$_3$ content of the catalyst.
(d) % based on total polymer (solid + soluble) formed.

EXAMPLES 19 TO 21

A 2 liter glass flask fitted with an anchor stirrer formed from polytetrafluoroethylene was evacuated to 1.0 mm of Hg and pressurised to atmospheric pressure with nitrogen. 40 g of dry polypropylene powder was added and this powder was stirred. A water jacket kept the flask at 60° C. The flask was evacuated to 1.0 mm of Hg and then pressurised to atmospheric pressure with dry nitrogen to remove air and moisture from the apparatus. This was repeated twice more. The evacuation and pressurisation procedure was then effected three times with propylene containing about 0.12 mol % of hydrogen.

10 mmols of aluminium diethylmonochloride, as a 1.2 molar solution in heptane, was then added to the stirred polymer. After 2 minutes, 1.0 mmol of tri(n-butyl)amine was added as a 0.5 molar solution in heptane. After a further interval of 2 minutes had elapsed, a suspension in the inert hydrocarbon diluent containing 2 mmols of TiCl$_3$-I, TiCl$_3$-II or TiCl$_3$-IV was added and the propylene/hydrogen mixture added continuously from a metering device so as to maintain the pressure within the apparatus at atmospheric pressure. 15 minutes after the addition of the titanium trichloride product, the propylene/hydrogen mixture was turned off and the flask evacuated over 2 minutes to remove heptane and the inert hydrocarbon diluent from the flask. The pressure was then restored to atmospheric pressure with the propylene/hydrogen mixture and polymerisation allowed to take place for 4 hours, measured from the time that the titanium trichloride product was introduced. Polymerisation was terminated with 5 ml of isopropanol and 5 ml propylene oxide and the polymer was dried in a vacuum oven at 120° C. for one hour.

Further details are given in Table 3.

Table 3

| Example | Type of TiCl$_3$ | Yield of Solid Polymer (g/mMol TiCl$_3$) (e) |
|---|---|---|
| 19 | I | 20.2 |
| 20 | II | 34.5 |

Table 3-continued

| Example | Type of TiCl₃ | Yield of Solid Polymer (g/mMol TiCl₃) (e) |
|---|---|---|
| 21 | IV | 29.0 |

Notes to Table 3
(e) Weight of polymer formed relative to the $TiCl_3$ content of the catalyst.

EXAMPLES 22 TO 27

The mill used for the first stage of milling was as described in Example 7. The mill was evacuated and pressurised as in Example 7 and 148 g (1109 mmol) of ahydrous aluminium chloride were added. After evacuation and repressurisation, 107 g (535 mmol) of Stauffer-TiCl₃-AA were then added. (The molar ratio of added aluminium chloride to titanium trichloride content of TiCl₃-AA was 2.07 to 1.) The mill was rotated at 60 rpm for 64 hours whilst running water at 22° C. over the exterior of the mill. Milling was stopped and the ground material was removed from the mill under nitrogen. A portion of the ground material was contacted with a mixture of di-n-butyl ether (30% by volume) and n-heptane (70% by volume). Analysis of the product which had been so treated showed the presence of residual aluminium chloride in an amount of 1.45 moles of aluminium chloride for each mole of titanium trichloride.

Portions of the ground material were placed in a mill as described in Example 1. Titanium tetrachloride and diphenylsulphone were then added to the mill in the proportions indicated in Table 4. The mill was then rotated at 120 rpm for 42 hours whilst running water at 20° C. over the exterior of the mill.

The milled product was removed from the mill and washed with toluene at 110° C. as described in Example 1 for material TiCl₃-I.

Details of the proportions of the materials present during the milling and the analysis of some of the products are set out in Table 4.

Table 4

| | Materials added to TiCl₃ for milling | | | Analysis of washed product | |
|---|---|---|---|---|---|
| Example No. | AlCl₃ (moles/g. atom Ti) | DPS (a) (moles/g. atom Ti) | TiCl₄ (moles/g. atom Ti) | AlCl₃ (moles/g. atom Ti) | DPS (a) (moles/g. atom Ti) |
| 22 | 2.07 | 0.80 | 0.20 | 0.70 | 0.11 |
| 23 | 2.07 | 0.95 | 0.20 | 0.66 | 0.14 |
| 24 | 2.07 | 1.10 | 0.20 | 0.68 | 0.19 |
| 25 | 2.07 | 1.60 | 0.20 | | |
| 26 | 2.07 | 1.90 | 0.20 | | |
| 27 | 2.07 | 2.20 | 0.20 | | |

Notes to Table 4
(a) DPS means diphenylsulphone.

EXAMPLES 28 TO 36

The products of Examples 22 to 27 were used to effect the polymerisation of propylene at 70° C. using the procedure of Examples 10 to 18 with the exception that in Examples 32, 34 and 36 no tri(n-butyl)amine was introduced into the polymerisation vessel. The polymerisation results obtained are set out in Table 5.

Table 5

| Example No. (f) | Form of TiCl₃ | Yield of Solid Polymer (g/mMol TiCl₃) (c) | % Weight of Soluble Polymer (d) |
|---|---|---|---|
| 28 | 22 | 12.7 | 4.4 |
| 29 | 23 | 17.9 | 3.2 |
| 30 | 24 | 15.7 | 3.3 |
| 31 | 25 | 23.7 | 4.4 |
| 32* | 25 | 16.4 | 5.2 |
| 33 | 26 | 59 | 1.0 |
| 34* | 26 | 48.1 | 0.7 |
| 35 | 27 | 24.6 | 1.6 |
| 36* | 27 | 19.1 | 1.6 |

Notes to Table 5
(c) and (d) are as defined in Notes to Table 2.
(f) *means that the polymerization vessel did not contain added tri(n-butyl)amine.

EXAMPLES 37 AND 38

Aluminium chloride and Stauffer-TiCl₃-AA were milled together as described for the initial stage of the millings of Examples 22 to 27 with the exception that the molar ratio of added aluminium chloride to titanium trichloride content of TiCl₃-AA was 1.07 to 1. When this ground product was contacted with a mixture of di-n-butyl ether and n-heptane as described in Examples 22 to 27, the amount of residual aluminium chloride was 0.63 mole for each mole of titanium trichloride. Portions of the ground material were placed in a mill as described in Example 1. Titanium tetrachloride and diphenylsulphone were then added to the mill in the proportions indicated in Table 6, the procedure otherwise being as described for the later stage of the millings of Examples 22 to 27. Details of the millings are summarised in Table 6.

Table 6

| | Materials added to TiCl₃ for milling | | |
|---|---|---|---|
| Example No. | AlCl₃ (moles/g. atom Ti) | DPS (a) (moles/g. atom Ti) | TiCl₄ (moles/g. atom Ti) |
| 37 | 1.07 | 90 | 20 |
| 38 | 1.07 | 105 | 20 |

Notes to Table 6
(a) DPS means diphenylsulphone.

EXAMPLES 39 TO 42

The products of Examples 37 and 38 were used to effect the polymerisation of propylene at 70° C. using the procedure of Examples 10 to 18, with the exception that in Examples 40 and 42 no tri(n-butyl)amine was introduced into the polymerisation vessel. The polymerisation results are set out in Table 7.

Table 7

| Example No. (f) | Form of TiCl₃ | Yield of Solid Polymer (g/mMol TiCl₃) (c) | % Weight of Soluble Polymer (d) |
|---|---|---|---|
| 39 | 37 | 61.5 | 0.84 |
| 40* | 37 | 48.2 | 0.54 |
| 41 | 38 | 53.4 | 1.2 |

Table 7-continued

| Example No. (f) | Form of TiCl₃ | Yield of Solid Polymer (g/mMol TiCl₃) (c) | % Weight of Soluble Polymer (d) |
|---|---|---|---|
| 42* | 38 | 36.7 | 0.94 |

Notes to Table 7
(c) and (d) are as defined in Notes to Table 2.
(f) *is as defined in Notes to Table 5.

EXAMPLE 43

The milling procedure of Examples 22 to 27 was repeated with the exception that the Stauffer-TiCl₃-AA was milled with 0.50 mole, relative to the titanium trichloride content of the TiCl₃-AA, of aluminium chloride for 67 hours, 0.50 mole of diphenylsulphone and 0.10 mole of titanium tetrachloride was added and the mixture was milled for 24 hours.

EXAMPLES 44 TO 51

The milled and washed product of Example 43 was used to polymerise propylene using the procedure of Examples 10 to 18, with the exception that different polymerisation temperatures were used and, in Examples 44, 46, 48 and 50, no tri(n-butyl)amine was introduced into the polymerisation vessel. The polymerisation temperatures and results are set out in Table 8.

Table 8

| Example No. (f) | Polymerisation Temperature (°C.) | Yield of Solid Polymer (g/mMol TiCl₃) (c) | % Weight of Soluble Polymer (d) |
|---|---|---|---|
| 44* | 50 | 26.6 | 0.27 |
| 45  | 50 | 30.8 | 0.28 |
| 46* | 60 | 40.6 | 0.60 |
| 47  | 60 | 47.4 | 0.34 |
| 48* | 70 | 53.0 | 0.99 |
| 49  | 70 | 60.1 | 0.57 |
| 50* | 80 | 52.4 | 1.77 |
| 51  | 80 | 57.6 | 1.66 |

Notes to Table 8
(c) and (d) are as defined in Notes to Table 2.
(f) *is as defined in Notes to Table 5.

We claim:

1. In a process of treating a transition metal halide in which a solid halide of a transition metal of Groups IVA to VIA of the Periodic Table is subjected to grinding in the presence of a Lewis Acid compound and at least one organic sulphur-containing compound of one of the formulae (A), (B) or (C), and the ground product is washed with a liquid medium, wherein
formula (A) is

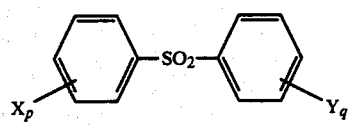

formula (B) is

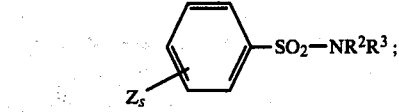

and
formula (C) is

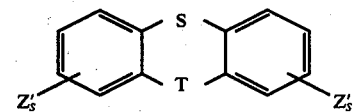

where
X, or each X, is, independently, a halogen atom, an alkyl, aryl, alkoxy, aryloxy, alkylthio, or arylthio group, or a group —NR¹R², or two groups X can together form an unsaturated hydrocarbon ring;
Y, or each Y, is, independently, a halogen atom, an alkyl, aryl, alkoxy, aryloxy, alkylthio, or arylthio group, or a group —NR¹R², or two groups Y can together form an unsaturated hydrocarbon ring; or a group X and a group Y may be replaced by a link between the two phenyl groups attached to the —SO₂— group, the linkage being either direct or through a group —O—, —CH₂—, —NR¹—, —S—, or —CO—;
R¹ is a hydrogen atom or a hydrocarbyl group;
R² is a hydrocarbyl group;
p and q are each, independently, an integer from 0 up to 5;
Z, or each Z, is, independently, a halogen atom, an alkyl, aryl, alkoxy, aryloxy, alkylthio, or arylthio group, or a group —NR¹R², or two groups Z can together form an unsaturated hydrocarbon ring;
R³ is a hydrocarbyl group or a group

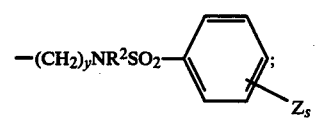

s is an integer from 0 up to 5;
y is a positive integer;
T is —S—, —O—, —NR²—, or —CO—; and
Z', or each Z', is, independently, a halogen atom, an alkyl, aryl, alkoxy, aryloxy, alkylthio or arylthio group, or a group —NR¹R², the improvement which comprises adding up to 2.50 moles of aluminum chloride to the solid halide of the transition metal for each gramme atom of the transition metal which is present in the solid halide of the transition metal, grinding the mixture of aluminum chloride and the solid halide of the transition metal, adding to the ground mixture from 0.01 up to 0.50 moles of titanium tetrachloride, and from 0.10 up to 2.50 moles of the organo-sulphur containing compound, for each gramme atom of the transition metal which is present in the solid halide of the transition metal, grinding the mixture thereby obtained and washing the ground product with a liquid medium capable of dissolving the at least one organic sulphur-containing compound and at least one of aluminum chloride or titanium tetrachloride or a complex of the at least one organic sulphur-containing compound and at least one of aluminum chloride or titanium tetrachloride.

2. In an olefine polymerisation catalyst comprising:
(1) a solid compound of a transition metal; and
(2) at least one organo-metallic compound of aluminum, or of a non-transition metal of Group IIA of the Periodic Table, or a complex of an organo-metallic compound of a non-transition metal of Group IA or IIA of the Periodic Table and an organo-aluminum compound; the improvement which comprises using as component (1) of the catalyst the product of the process of claim 1.

3. In an olefine polymerisation catalyst comprising:
(1) a solid compound of a transition metal;
(2) at least one organo-metallic compound of aluminum or a non-transition metal of Group IIA of the Periodic Table, or a complex of an organo-metal compound of a non-transition metal of Group IA or IIA of the Periodic Table and an organo-aluminum compound; and
(3) an organo-Lewis Base compound which is effective to alter the activity and/or stereo-specificity of the catalyst system; the improvement which comprises using as component (1) of the catalyst the product of the process of claim 1.

4. The catalyst of claim 3 wherein component (3) is one of the sulphur-containing compounds of one of the formulae (A), (B) or (C), or a compound of one of the formulae (D), (E) or (F), where formula (D) is $R^4R^5R^6P(O)_m$;

formula (E) is $R^8R^9R^{10}N$;

and formula (F) is $R^{11}R^{12}P(Q)_zED$ where
$R^4$, $R^5$ and $R^6$ are each independently, an alkyl or aryl group, or a group —$NR^7_2$ or —$OR^7$;
$R^7$ is an alkyl group of 1 to 4 carbon atoms;
m is 0 or 1;
$R^8$ and $R^9$ are hydrocarbyl groups;
$R^{10}$ is a hydrogen atom, an alkyl group or a group —$C_nH_{2n}NR^8R^9$;

or $R^8$ and $R^9$, optionally with $R^{10}$, together form a substituted or unsubstituted, saturated or unsaturated, condensed or uncondensed ring system;
n is 1, 2 or 3;
$R^{11}$ is halogen, a hydrocarbyl group, a group —$NR^2_2$ or —$OR^2$, a heterocyclic group or a group (E—L—G);
$R^2$ is a hydrocarbyl group;
$R^{12}$ is a halogen, a hydrocarbyl group, a group —$NR^2_2$ or —$OR^2$, a heterocyclic group, a group (E—L—G) or ED;
each E is —O—, —S—, or —$NR^2$—, and may be the same or different;

G is —$OR^2$, —$SR^2$, —$NR^2_2$, —$PR^2_2$ or a heterocyclic ring system whereof the heteroatom is O, S, N or P;
D is a group —LG or —$P(Q)_zR^{11}R^{12}$, or, when $R^{12}$ is ED, both the D groups may together form a group —L—;
L is a bivalent hydrocarbyl radical such that E and G, or E and E, are separated by not more than 3 carbon atoms;
Q is an oxygen or sulphur atom; and
z is 0 or 1.

5. The process of claim 1 wherein the solid halide of a transition metal is a titanium trichloride composition which incorporates aluminium chloride and which is the product obtained by the reduction of titanium tetrachloride with aluminium metal.

6. The process of claim 1 wherein the organic sulphur-containing compound is diphenylsulphone, 4(phenylthio)diphenylsulphone, 4(phenoxy)diphenylsulphone, 2,4'-(diphenoxy)diphenylsulphone, 4,4'-(diphenoxy)diphenylsulphone, 4,4'-dichlorodiphenylsulphone, 4,4'-(dimethyl)diphenylsulphone, 2,4,4'-(trimethyl)diphenylsulphone, 6-phenylsulphonyltetralin, dibenzothiophen-5,5-dioxide, phenoxathiin-10,10-dioxide, thioxanthene-10,10-dioxide, 10-methylphenothiazine-5,5-dioxide, N,N-dimethylbenzenesulphonamide, N,N-diethylbenzenesulphonamide, N,N-diphenylbenzenesulphonamide, N-methyl-N-phenyl-4-bromobenzenesulphonamide, N-methyl-N-phenyl-4-chlorobenzenesulphonamide, N,N-diethyl-4-phenoxybenzenesulphonamide, N,N'-dibenzenesulphonyl-N,N'-dimethyl-1,2-diaminoethane, phenoxathiin, thianthrene or N-methyl-phenothiazine.

7. The process of claim 1 wherein the solid halide of a transition metal is a titanium trichloride composition of the formula $TiCl_3bAlCl_3$, where b is 0 up to about 0.35, and from 0.01 up to 2.50 moles of aluminium chloride are added for each gramme atom of titanium which is present in the titanium trichloride composition.

8. The process of claim 1 wherein the amounts of added aluminium chloride and added organic sulphur-containing compound are such that $$0.8A \leq S \leq 0.8A + 0.35$$

where
S is the number of moles of the organic sulphur-containing compound which is added; and
A is the number of moles of aluminium chloride which is added.

9. The process of claim 1 wherein the solid halide of a transition metal is $TiCl_3cAlCl_3$, where c is from 0.30 up to 0.35, and 0.50 mole of aluminium chloride, 0.10 to 0.20 mole of titanium tetrachloride and 0.60 mole of diphenylsulphone are added for each gramme atom of titanium present in the $TiCl_3cAlCl_3$.

10. The process of claim 1 wherein the solid halide of a transition metal is $TiCl_3cAlCl_3$, where c is from 0.30 up to 0.35, and 1.07 moles of aluminium chloride, 0.20 mole of titanium tetrachloride and 0.90 to 1.05 mole of diphenylsulphone are added for each gramme atom of titanium present in the $TiCl_3cAlCl_3$.

11. The process of claim 1 wherein the solid halide of a transition metal is $TiCl_3cAlCl_3$, where c is from 0.30 up to 0.35, and 2.07 moles of aluminium chloride, 0.20 mole of titanium tetrachloride and 1.90 moles of diphenylsulphone are added for each gramme atom of titanium present in $TiCl_3cAlCl_3$.

12. The process of claim 1 wherein grinding of the solid halide of a transition metal and the aluminium chloride is effected for at least 30% of the total grinding time.

13. The process of claim 1 wherein the ground product is washed with toluene, xylene or chlorobenzene.

14. The process of claim 1 wherein washing is effected at a temperature of at least 80° C. up to 150° C.

15. The catalyst of claim 4 wherein component (3) is dibutylamine, triethylamine, tributylamine, N,N,N',N'-tetramethylenediamine, hexamethyl phosphoric triamide, ethyl N,N,N',N'-tetramethylphosphorodiamidate, N,N,N',N',N''-pentamethyl-N''-β-dimethylaminoethyl phosphoric triamide, 2-dimethylamino-1,3-dimethyl-1,3,2-diazaphospholidine-2-oxide or octamethylpyrophosphoramide.

16. The catalyst of claim 2 which also includes a substituted or unsubstituted polyene which is selected from 3-methyl-1,4,6-heptatriene, cyclooctatriene, cyclooctatetraene, cycloheptatriene and the alkyl- or alkoxy-substituted derivatives of cyclooctatriene, cyclooctatetraene or cycloheptatriene.

* * * * *